(12) United States Patent
Tikka et al.

(10) Patent No.: US 9,142,887 B2
(45) Date of Patent: Sep. 22, 2015

(54) FRONT END MODULE COMPRISING AN ANTENNA TUNER

(75) Inventors: Pasi Tikka, Munich (DE); Gerhard Zeller, Munich (DE)

(73) Assignee: EPCOS AG, Munich (DE)

( * ) Notice: Subject to any disclaimer, the term of this patent is extended or adjusted under 35 U.S.C. 154(b) by 546 days.

(21) Appl. No.: 13/260,763

(22) PCT Filed: Apr. 12, 2010

(86) PCT No.: PCT/EP2010/054750
§ 371 (c)(1),
(2), (4) Date: Nov. 28, 2011

(87) PCT Pub. No.: WO2010/121914
PCT Pub. Date: Oct. 28, 2010

(65) Prior Publication Data
US 2012/0062431 A1  Mar. 15, 2012

(30) Foreign Application Priority Data
Apr. 23, 2009  (DE) .......................... 10 2009 018 648

(51) Int. Cl.
*G01R 29/10* (2006.01)
*H01Q 1/50* (2006.01)
*H01Q 1/52* (2006.01)
*H01Q 5/314* (2015.01)
*H04B 1/04* (2006.01)

(52) U.S. Cl.
CPC ............... *H01Q 1/521* (2013.01); *H01Q 1/525* (2013.01); *H01Q 5/314* (2015.01); *H04B 1/0458* (2013.01)

(58) Field of Classification Search
CPC .... G01R 29/10; G01R 31/2822; G01R 27/06; H04B 17/0007; H04B 17/0027; H04B 17/0035; H04B 17/0032; H04B 17/0062; H04B 17/0012; H04B 1/0458; H04B 1/18; H04B 1/48; H04B 1/406; H04B 1/44; H04B 1/0053; H04B 1/0057; H04B 1/006; H04B 1/0067; H04B 1/005; H03H 7/38; H03H 7/40; H03F 7/383; H03F 7/0115; H03F 7/1758; H03F 7/1766; H03F 7/465; H03F 7/0123; H03F 7/0153; H03F 7/12; H01Q 1/521; H01Q 7/005; H01Q 5/314; H01Q 5/321; H01Q 5/328; H01Q 5/335
See application file for complete search history.

(56) References Cited

U.S. PATENT DOCUMENTS

| | | | |
|---|---|---|---|
| 5,428,831 A | 6/1995 | Monzello et al. | |
| 5,525,940 A * | 6/1996 | Heikkila et al. | 333/17.1 |

(Continued)

FOREIGN PATENT DOCUMENTS

| | | |
|---|---|---|
| EP | 1 513 276 A2 | 3/2005 |
| JP | 2006261998 A | 9/2006 |

(Continued)

*Primary Examiner* — Robert Karacsony
*Assistant Examiner* — Patrick Holecek
(74) *Attorney, Agent, or Firm* — Slater & Matsil, L.L.P.

(57) ABSTRACT

A front end module for a wireless transmission/reception device has two antennas and two signal paths connected thereto. A mismatch in the antenna is identified by monitoring the transmitted power and the reflected power in the active and passive signal paths and using the powers in a controller to generate a control signal for the antenna tuner. In this case, decreasing isolation between the first and second antennas and the first and second signal paths is identified, and is compensated for using different devices, in order to ensure faster and safer antenna matching.

18 Claims, 3 Drawing Sheets

(56) References Cited

U.S. PATENT DOCUMENTS

| | | |
|---|---|---|
| 5,940,040 A | 8/1999 | Koyanagi et al. |
| 6,101,374 A * | 8/2000 | Kono .......................... 455/115.1 |
| 7,043,269 B2 | 5/2006 | Ono et al. |
| 7,107,033 B2 | 9/2006 | du Toit |
| 7,786,819 B2 * | 8/2010 | Ella et al. .................... 333/17.3 |
| 8,045,926 B2 * | 10/2011 | Martikkala et al. .......... 455/63.4 |
| 8,396,003 B2 * | 3/2013 | Leinonen et al. ............. 370/252 |
| 2002/0101907 A1 | 8/2002 | Dent et al. |
| 2002/0145483 A1 * | 10/2002 | Bouisse ....................... 333/17.3 |
| 2005/0059362 A1 | 3/2005 | Kalajo et al. |
| 2005/0215281 A1 | 9/2005 | Oodaira |
| 2006/0197538 A1 * | 9/2006 | Leinonen et al. ............. 324/533 |
| 2007/0066272 A1 | 3/2007 | Vassiliou et al. |
| 2007/0093282 A1 | 4/2007 | Chang et al. |
| 2008/0055168 A1 | 3/2008 | Massey et al. |

FOREIGN PATENT DOCUMENTS

| | | |
|---|---|---|
| JP | 2007215040 A | 8/2007 |
| JP | 2008512925 A | 4/2008 |

\* cited by examiner

FRONT END MODULE COMPRISING AN ANTENNA TUNER

This patent application is a national phase filing under section 371 of PCT/EP2010/054750, filed Apr. 12, 2010, which claims the priority of German patent application 10 2009 018 648.4, filed Apr. 23, 2009, each of which is incorporated herein by reference in its entirety.

BACKGROUND

In modern terminals for mobile communication, use is increasingly being made of adaptive matching circuits for tuning the antenna. Such matching circuits are intended to be used to ensure that the terminal always has optimum antenna matching even in changing environments which influence the impedance of the antenna, the antenna matching being used to improve the transmission and reception operation of the terminal by saving transmission power and improving the reception quality. For this purpose, a detector for determining the reflected power is connected to the respective signal path, which is a transmission path or a hybrid transmission/reception path.

The reflected power is a measure of the mismatch and can and is intended to be minimized by the matching circuit. For this purpose, a control signal is produced from the value of the reflected power, as determined by the detector, using a controller and is used to adjust the adaptive matching network. In known front end modules which are used in such terminals for mobile communication, such a detector is typically used on the principal antenna in order to match both the antenna and the transmission/reception device to a changing environment in combination with an adaptive matching network.

The problem with known matching circuits is that the reflected power can be ascertained only in transmission mode. However, a reflected but immeasurable power also leads to a loss of signal intensity and signal quality in reception mode. This means that the antenna tuner or the relevant matching network can, strictly speaking, be matched only to the transmission signal, while in the reception band (Rx band), which is different from the transmission band (Tx band), it is possible to match the reception mode only "blind" and particularly using predetermined stored empirical values.

Furthermore, when measuring the reflected power, it is not possible to obtain any information about the direction in which matching needs to be performed. Therefore, it is difficult to set optimum matching, particularly when the control signal is used to perform "matching" in the wrong direction, so that ultimately the mismatch is not eliminated or is not eliminated immediately. It is also disadvantageous if the detector and the controller connected thereto detect only a secondary minimum for reflected power, which secondary minimum it is unable to overcome using its closed-loop control algorithm, and it thus misses the optimum matching value.

SUMMARY OF THE INVENTION

In one aspect, the present invention specifies a front end module that can be used to improve the matching of an actively used antenna.

In a preferred embodiment with a front end having two antennas, the isolation between the first and second antenna is also monitored in addition to monitoring the first antenna. The two antennas are provided for different frequency ranges. While the first antenna is provided for a first relatively high-frequency frequency range, the second antenna is optimized for a second frequency range, which contains low frequencies in comparison with the first frequency range. In this case, the second frequency range may be approximately one octave lower than the first frequency range.

Usually, the first antenna is provided for the two-gigahertz range, starting from 1700 megahertz, and the second antenna is provided for the one-gigahertz range, starting from approximately 750 megahertz.

It has now been found that as matching becomes poorer, the isolation between the first and the second antennas is also impaired. The invention accordingly determines the isolation and hence the crosstalk between the first and second antennas or between the first and second signal paths connected to the respective antenna and derives therefrom a measure of the mismatch.

Besides the first measured value for the reflected power, which is determined by the first detector, which is connected to the first signal path and to the first antenna, it is now possible for a second value, which is determined by a second detector in the second signal path, which is connected to the second antenna, to be routed to a controller. The controller takes these two pieces of information as a basis for generating a control signal. The control signal is used for closed-loop control of the antenna tuner. By subjecting the antenna tuner to closed-loop control, the matching of the first antenna to the first signal path is altered and optimized. The controller receives and processes information from both detectors in this case. The first measured value is ascertained previously, directly by the first detector as a measure of the power reflected by the first antenna. As the second value used for generating the control signal, the signal from the first detector is compared with the signal from the second detector by means of a comparator, a measure of the isolation is obtained therefrom and a correction value is generated. The control signal is then formed from a combination of the correction value and the signal from the detector arranged in the active signal path.

The module according to the invention has the advantage that the two measured values are used to identify a mismatch more quickly and more precisely, so that quicker and more precise matching of the respective active antenna is possible. Since front end modules usually already have two antennas with a signal path and a detector arranged therein, respectively, it is possible for the module according to the invention to be produced without additional hardware in comparison with known modules. The additional functions can then be generated by the controller alone, which, to this end, possibly requires only different programming. However, it is also possible for the comparator and the connection to be implemented by means of fixed wiring.

Self-evidently, it is also possible for the module according to the invention to be operated in the second, low-frequency frequency range using the second antenna and for the signal from the second detector to be combined with a correction value which is ascertained by comparing the signals from the two detectors. In this way, it is also possible to match the second antenna in optimum fashion by actuating the second antenna tuner connected thereto.

In one refinement of the module, the comparator is set up such that it generates a correction value which is a measure of the drop below a threshold value for the reciprocal isolation between the two signal paths, that is to say the reciprocal isolation between the two antennas. So long as the isolation does not drop below the threshold value, the generator does not produce a correction value. The threshold value can be stipulated at a value which corresponds to an optimum isolation which can be achieved with the front end and the two antennas. A correction value is then thus already ascertained in the event of the deviation from this optimum value. However, it is also possible to set the threshold value lower in order to avoid unnecessary control loops.

In a further refinement of the module, a further antenna is provided which is connected to a further signal path and a detector coupled to this signal path for the purpose of measuring the power reflected by the antenna. The further detector can be used to determine, as a further correction value, the isolation between the active signal path or the active antenna and this further antenna, and the isolation can be used to generate a further-improved control signal. The three measured values allow the control signal to be ascertained even more exactly and better and hence allow the matching to take place more exactly and more quickly.

The control signal is used for closed-loop control of the antenna tuner by altering the input and output impedances thereof. To this end, in one refinement, the antenna tuner respectively has a first capacitance, connected in series with the signal path, and a second capacitance, in parallel with the signal path, both of which can be altered on the basis of the control signal. Matching is then performed by altering the ratio of the first and second capacitances using the control signal. In addition, the antenna tuner may have high-quality static inductances which are implemented as coils, for example.

The alterable capacitances may be in the form of varactors, the capacitance of which can be adjusted smoothly using a bias voltage. It is also possible for the alterable capacitances to be implemented as MEMS (Micro Electro Mechanical System) elements, which involve a control voltage and the electrostatic forces prompted thereby being used to move an actuator which provides closed-loop control for the capacitance of a capacitor progressively or continuously by altering the plate spacing. A further option for implementing alterable capacitances is to use capacitor banks, which involve the control signal being taken as a basis for interconnecting a different number of possibly different capacitors so as to set a resulting capacitance value.

The detectors used may be all detectors which are able to determine the intensity of a transmitted or reflected signal on the signal line on the basis of direction. Usually, this is done using a directional coupler, however, which involves two oppositely connected coupling lines being arranged in parallel with the signal line, via which coupling lines a decoupling signal is a measure of the power flowing in one direction.

The power is converted into a measured voltage by means of a logarithmizer which generates a linear relationship between measured power in dB and output matching. This signal is supplied to the controller as a measured variable by means of A/D conversion.

The control signal generated by the controller is preferably a DC signal which is generated by means of a D/A converter and is then used directly as a control voltage, for example.

It is advantageous if the controller produces a fundamental voltage without a control signal in the first place, the fundamental voltage being applied to the antenna tuner. The control signal to be generated is then generated as a deviation from this fundamental voltage, for example, by generating a higher or lower voltage. The fundamental voltage is used to set the antenna tuner to a matching value which is arranged in the center of its maximum closed-loop control interval. In this way, it is then possible to correct mismatches in both directions equally, since the antenna tuner can be subjected to closed-loop control in both matching directions equally up to the maximum value.

The module according to the invention is used to ascertain information about the surroundings of the antenna, at least insofar as the information influences the impedance of the antenna surroundings.

A first condition, which is uninfluenced by capacitive or inductive interactions with the surroundings of the terminal or module, is when the terminal is in a free atmosphere.

A condition which is different than this arises as early as when the terminal is close to the user, is picked up by the latter or is additionally held to the head. Further influencing actions are obtained for folding or sliding mobile phones by means of corresponding folding open and shut and sliding open and shut an appropriately movable monitor or an appropriately movable keypad. A maximum effect on the impedance surroundings of the antenna is obtained when the terminal is close to a metal area and particularly a metal plate.

The module according to the invention can be used to detect such conditions and to use them for further applications. By way of example, it is thus possible to reduce the transmission power in the active signal path of the module when a condition is detected which corresponds to the mobile phone being put to the head of a user. In this way, it is possible to reduce the risk of damage to the user as a result of excessive electromagnetic radiation by means of reduced transmission power. The SAR value (corresponds to the specific absorption rate in watts/kg) is therefore reduced.

It is also possible, by determining the isolation between the active signal path and further signal paths, which are usually used only for reception, to reduce the risk of damage to these further signal paths or to the output stages connected thereto by performing further filtering in the signal path.

In one advantageous refinement, the module therefore has a connectable supplementary filter in a signal path, which filter is connected only when the reciprocal isolation between this signal path and an active signal path used for transmission, which isolation is determined by the controller, drops below a threshold value. This ensures that in the event of a suddenly occurring, extreme ambient condition which severely alters the impedance, despite the severe crosstalk caused thereby, damage to output stages of other signal paths by the active transmission signal is avoided. A further option for avoiding damage in a passive signal path as a result of crosstalk power from the transmission signal in the active signal path is to isolate this passive signal path from the antenna connected thereto when the detected isolation drops below a particular threshold value. This safely protects the passive signal path from excessive crosstalk.

BRIEF DESCRIPTION OF THE DRAWINGS

The invention is explained in more detail below with reference to exemplary embodiments and the associated figures.

The following list of reference symbols may be used in conjunction with the drawings:
AN1 First antenna
AN2 Second antenna
AT1 First antenna tuner AT2 Second antenna tuner
CT Controller
Det1 First detector (directional coupler)
Det2 Second detector
Ex External influences
F1, F2 Filter device
Komp Comparator
KP Coupling
MI Mixer
PS Path switch
SB Circuit block
SE Antenna switch
SP1, SP2, SP Signal path
$S_{ST}$ Control signal
SZ Supplementary switch
ZF Supplementary filter

DETAILED DESCRIPTION OF ILLUSTRATIVE EMBODIMENTS

Figure 1:
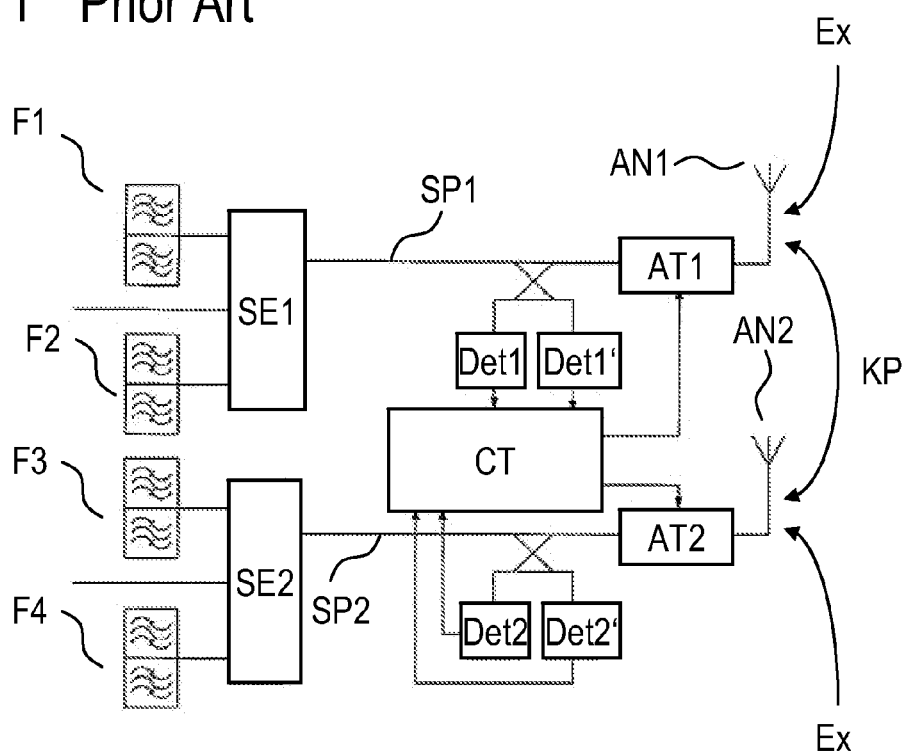
FIG. 1 shows an inherently known module with two antennas together with associated antenna tuners and signal paths.

FIG. 1 shows a known front end module for a terminal of a wireless transmission/reception device with two antennas AN1, AN2. Each antenna is connected to an antenna tuner AT1 or AT2. The respective antenna tuner is connected to a switching unit SE1, SE2 which acts as an antenna switch and which can be used to selectively connect a plurality of different filters F1, F2, F3, F4 to the respective signal path SP1, SP2. The different filters are each associated with a frequency band for a mobile radio system. In FIG. 1, the filters F1-F4 are in the form of duplexers and have interconnected transmission and reception filters for the respective mobile radio system. However, it is also possible for the switching units SE1, SE2 in TDD mode to connect the signal paths SP1, SP2 selectively to a respective single filter for transmission or reception mode in a mobile radio system.

The respective signal path has the detectors DET1, DET2 (DET1', DET2') coupled to it, the detectors being able to determine a reflected power and therefore be in the form of directional couplers and logarithmizers, for example. The detectors are connected to a controller CT which takes the reflected power detected in a signal path (for example, SP1) and ascertains the mismatch and hence controls the antenna tuner AT1. In this known arrangement, only one antenna or only one signal path and the detectors connected thereto are active in each case. The known front end module can therefore match only the active antenna in each case on the basis of the reflection caused thereby. Matching is necessary, since external influences EX affect the antennas AN1, AN2 and alter the impedance with respect to the surroundings, since they produce inductive and preferably capacitive interactions with respect to the antenna, for example. Further interactions which can alter the antenna matching are couplings KP between the first and the second antenna AN1/AN2.

Figure 2:
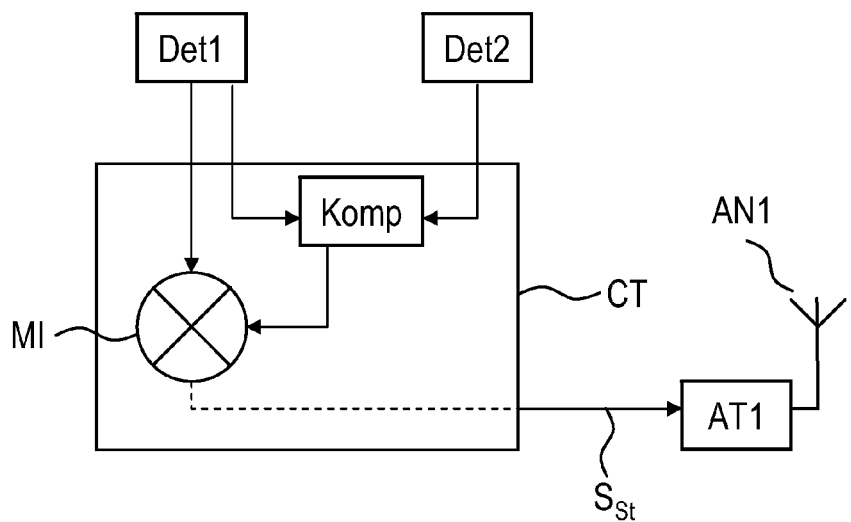
FIG. 2 shows a schematic illustration of details from a module according to the invention.

FIG. 2 now shows details from a circuit configuration according to the invention, which can be used to improve the inherently known front end module described in FIG. 1 in terms of faster and more precise antenna matching.

An active transmission/reception mode using the first antenna AN1 and the first signal path SP1 is assumed. The first detector DET1, coupled to the first signal path SP1, delivers a first signal to the controller CT. It is novel that the controller CT also uses signals from the second detector DET2 to match the first antenna. The signals from the second detector DET2 are compared with the signals from the first detector DET1 in a comparator KOMP in order to identify impaired isolation between the first and second antennas AN1, AN2. If such impaired isolation is identified, the comparator CT generates a correction signal which, together with the signals from the first detector DET1, is processed in a mixer MI on the basis of a prescribed algorithm to produce a control signal $S_{ST}$ and is sent to the first antenna tuner AT1. The latter comprises a matching network having at least one component which can be varied using the control signal and which can be used to set the impedance of the matching network.

Since, according to the invention, besides the known measured value from the detector connected to the active transmission path, the isolation with respect to coupling into the second antenna AN2 is now also used to produce the correction signal or control signal, it is now possible to identify a mismatch earlier and more safely than with an arrangement which uses only signals from the detector on the active signal path. Furthermore, the module according to the invention with the novel circuit arrangement has the advantage that when a first matching step has taken place, that is to say after a first alteration in the impedance of the matching network in the antenna tuner AT, the actual success is better identified. This is because it is possible to alter an alterable matching network in two different directions, in principle, with the matching network being designed to be either capacitive or inductive. Such alteration can accordingly also take place in a direction which leads away from optimum, that is to say from optimum impedance matching of the antenna. This condition is sometimes not identifiable from just one detector signal, however, since it is possible that the matching in the "incorrect" direction also temporarily results in reduced reflection. Using the correction value which is ascertained using the second detector DET2, it is possible to identify such matching in an incorrect direction more safely and more quickly.

The mode of action of the comparator KOMP when producing the correction signal can be described as follows. In free space, that is to say without the effect of the external influences EX indicated in FIG. 1, the isolation between the two antennas AN1/AN2 is approximately 10 to 15 dB. This isolation is sufficient for transmission in the first signal path SP1, for example, to involve only a small signal being injected into the second signal path via the second antenna AN2. The comparator KOMP then identifies such injected signals by comparing the signals delivered by the two detectors DET1, DET2. The isolation ascertained therefrom is compared in the comparator KOMP with a threshold value, which is usually at the poorer end of a permitted optimum isolation, that is to say at approximately 10 dB in the chosen example. If the isolation between the first and second antennas AN1, AN2 drops to a value below that, a correction signal is produced.

The threshold value prevents correction signals and, therefrom, control signals for the antenna tuner being produced despite a "mismatch" that can no longer be optimized, which signals ultimately cannot bring about a further improvement. This avoids unnecessary closed-loop control complexity, and similarly a heightened mismatch, as a result of deviation from the attained optimum value by fresh control signals.

Figure 3:
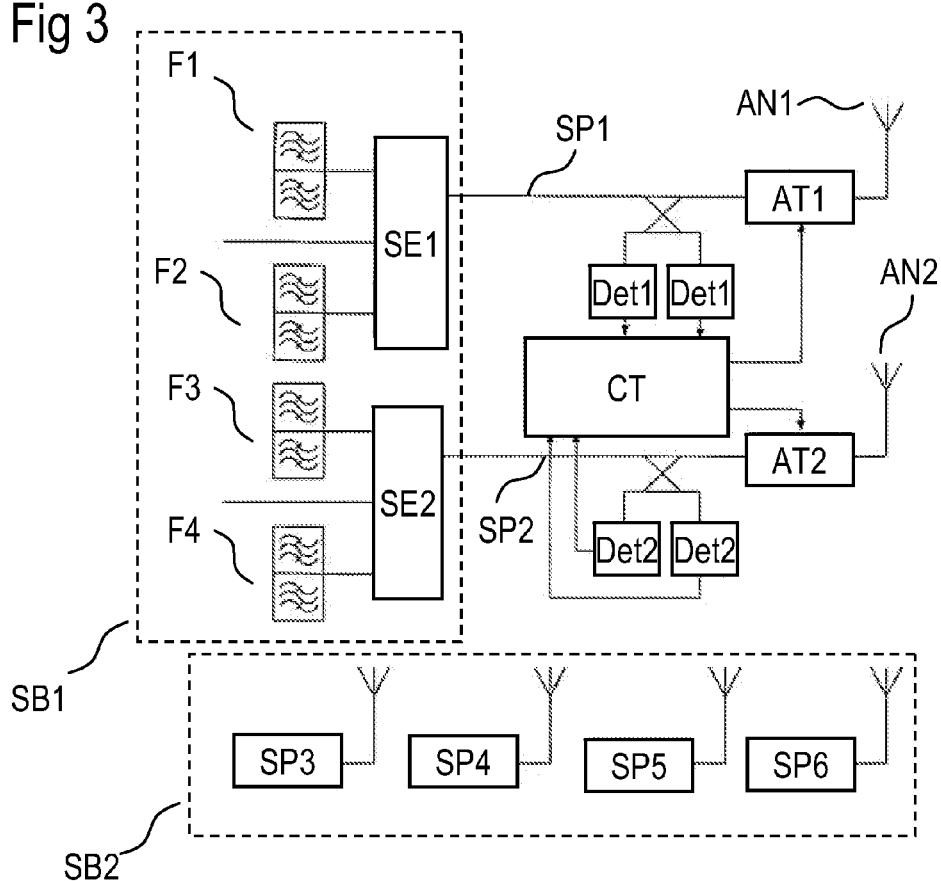
FIG. 3 shows a schematic illustration of a module according to the invention with further circuit blocks.

FIG. 3 shows further possible refinements of the front end module according to the invention. It shows a first circuit block SB1 and a second circuit block SB2, which are not part of the core of the invention, but develop the front end module further. In a first circuit block SB1, the further course of the first and second signal paths SP1, SP2 are shown. This essentially corresponds to a circuit arrangement as has already been described with reference to FIG. 1 and the known front end module discussed therein. The switching units SE1, SE2 can connect the signal paths SP1, SP2 to any number of filter devices F1-F4, collectively F. Each filter device may be associated with a separate frequency band and hence with a separate mobile ratio system. The filter device F may in each case be a duplexer or may be two subpaths to two individual filters for the transmission or reception path. The frequency ranges of the filter devices F1, F2 connected to the first switching unit SE1 are in the upper range of the useful frequencies in this case, for example, that is to say usually between 1710 and 2170 megahertz, in line with the specification of the antenna AN1 for the two-gigahertz range. Accordingly, the filter devices F3, F4 connected to the second switching unit SE2 are designed for "low-frequency" frequency bands below that in the one-megahertz range, that is to say usually for frequency bands which are between 824 and 960 megahertz.

In a further circuit block SB2 further antennas are merely indicated. The antennas are connected to further signal paths SB3, SB4, SB5 and SB6. In accordance with the invention, a module based on this refinement comprises at least one further antenna together with a signal path connected thereto. Each of these additional signal paths may be connected in the same way to a detector which is connected to the controller CT. By way of example, the additional antennas may be designed for mobile TV, WLAN, BlueTooth or a diversity antenna, which is used exclusively for RX signals (that is to say for reception), for example. Furthermore, the module may have an integrated GPS system with a separate antenna, the GPS system likewise being able to be examined and monitored for isolation from the other antennas or transmission/reception paths using a separate detector.

Figure 4:
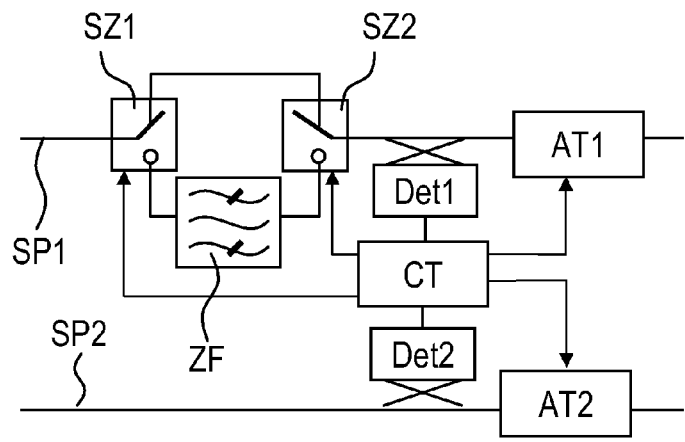
FIG. 4 shows a module with a selectively connectable supplementary filter in a signal path.

FIG. 4 shows an embodiment in which the information obtained in accordance with the invention about possibly impaired isolation between two antennas AN1, AN2 is utilized in order to integrate a supplementary filter ZF into one of the signal paths SP1. When poor isolation is identified between two antennas and the associated signal paths, this being identified in the event of a drop below a possibly further threshold value, the controller CT and two supplementary switches SZ1, SZ2 are used to connect the supplementary filter ZF into the signal path SP1. This can firstly prompt high-power transmission signals to be subjected to additional filtering, the transmission signals making injection into an adjacent signal path more difficult. However, it is also possible for the supplementary filter ZF to be connected into a passive signal path which, at the moment of observation, is used neither for transmitting nor for receiving.

In a passive signal path, the connected supplementary filter ZF can prevent the injection of an excessively high power into a sensitive receiver, for example an LNA. The supplementary filter then has a passband which corresponds to the reception band of the (currently) passive signal path or which has a band rejection filter for the frequencies being injected from the adjacent signal path. Such switches and supplementary filters can additionally also be incorporated into the second signal path SP2 or possibly further signal paths.

Figure 5:
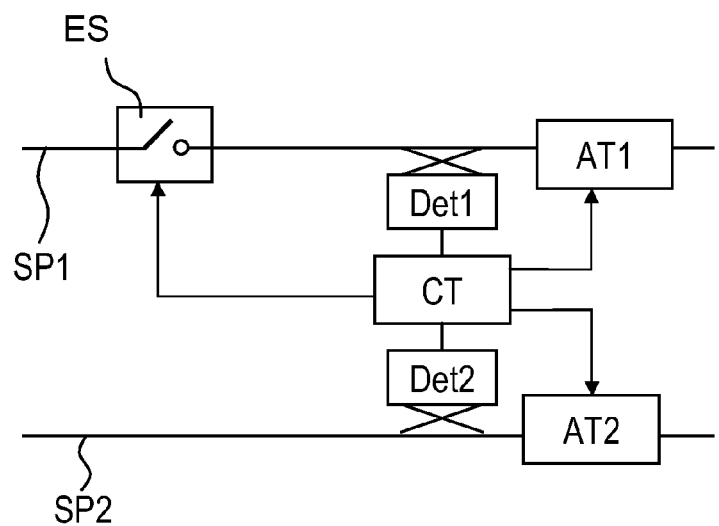
FIG. 5 shows a module according to the invention with a disconnectable signal path.

FIG. 5 shows a further embodiment which can be used to prevent damage to a reception device upon identification of poor isolation and hence excessive injection of power from the adjacent transmission path or the antenna connected thereto. In the event of a drop below a value for the isolation in a passive signal path SP1, the controller CT sends a signal to a path switch ES, which interrupts the signal path SP1. This prevents an excessive power from being injected into the signal path SP1 by isolating the latter from the antenna entirely. In this way too, a sensitive receiver is protected against damage by injected power.

Although shown only for the first signal path SP1, such a switch can also be arranged in the second signal path SP2.

The invention succeeds in attaining better matching of the antenna to changing ambient conditions. Improved matching also allows the transmission power to be reduced. Hence, the invention also improves and optimizes the SAR value, which is a measure of the energy which is radiated from an electromagnetic radiation source into human tissue and absorbed therein. A reduction in the SAR values can also be achieved by means of a further inventive refinement in which the transmission power is reduced when an external condition "telephoning with a mobile phone put to the head" is identified. This condition may be reflected in a quite definite mismatch which is identified by means of the identification of the mismatch in a manner which is improved in accordance with the invention.

The invention has been illustrated only using a few exemplary embodiments and is therefore not limited thereto. It is within the scope of the invention to combine the reflected power in a signal path connected to an antenna with a piece of supplementary information about impaired isolation in an adjacent signal path, the type and number of signal paths to be monitored or to be matched being able to be chosen as desired. Accordingly, the invention can also be used to determine not only the primary detector which determines the reflected power but also a number of correction values which corresponds to the number of additionally monitored paths, and hence to improve the matching still further. Furthermore, the front end module can be developed further in a manner which is known per se without deviating from the invention.

The invention claimed is:

1. A module for a front end of a wireless transmission/reception device, the module comprising:
   a first antenna for frequencies in a first high-frequency frequency range,
   a first signal path, which connects the first antenna to a first antenna tuner, connects the first antenna tuner to a first detector that is configured to measure reflected power, and connects the first detector to a first antenna switch,
   a second antenna for frequencies in a second frequency range, the second frequency range including lower frequencies than the first high-frequency frequency range,
   a second signal path, which connects the second antenna to a second antenna tuner, connects the second antenna tuner to a second detector that is configured to measure reflected power, and connects the second detector to a second antenna switch,
   a controller configured to take signals supplied by the first and second detectors as a basis for producing control signals for controlling the first and second antenna tuners,
   wherein the controller has a comparator configured to compare the signals from the first and second detectors in order to produce a correction value as a measure of a drop below a threshold value for the reciprocal isolation between the first and second signal paths,
   wherein the control signals are formed from a combination of the correction value and the signal from an active detector arranged in an active signal path, wherein the active detector is the first detector when the first signal path is the active signal path and wherein the active detector is the second detector when the second signal path is the active signal path,
   wherein one of the first signal path or second signal path has a selectively connectable supplementary filter, and
   wherein the supplementary filter is connected to one of the signal paths only when the reciprocal isolation between this signal path and the active signal path drops below the threshold value.

2. The module according to claim 1, further comprising a further antenna, connected to a further signal path and to a further detector configured to measure the reflected power,
   wherein the comparator ascertains a further correction value from a reciprocal isolation between the active signal path and the further signal path, and
   wherein the control signals for the antenna tuner in the respective active signal path is generated from the combination of the first and the further correction values and the signal from the active detector.

3. The module according to claim 1, wherein the first antenna tuner has a first capacitance, connected in series with the first signal path, and a second capacitance, connected in parallel with the first signal path, wherein the first and second capacitances can be altered on a basis of the control signal.

4. The module according to claim 3, wherein the antenna tuner further comprises static inductances.

5. The module according to claim 1, wherein the first and second detectors comprise directional couplers.

6. The module according to claim 1, wherein the control signals produced by the controller are DC signals.

7. The module according to claim 6,
   wherein the controller produces a normal voltage and the control signal is generated as a deviation from the normal voltage,
   wherein the first antenna tuner or the second antenna tuner arranged in the active signal path has a closed-loop control interval, and
   wherein the first antenna tuner or the second antenna tuner arranged in the active signal path is in a center of its closed-loop control interval when the normal voltage is applied.

8. The module according to claim 1, wherein the controller is configured to reduce transmission power in the active signal path when the reciprocal isolation between the active signal path and a passive signal path drops below a threshold value.

9. The module according to claim 3, wherein the second antenna tuner has a third capacitance connected in series with the second signal path and a fourth capacitance connected in parallel with the second signal path, wherein the third and fourth capacitances can be altered on the basis of the control signal.

10. The module according to claim 1, wherein the first antenna switch and the second antenna switch comprise separate switches.

11. A module, for a front end of a wireless transmission/reception device, the module comprising:
    a first antenna for frequencies in a first high-frequency frequency range,
    a first signal path, which connects the first antenna to a first antenna tuner, connects the first antenna tuner to a first detector that is configured to measure reflected power, and connects the first detector to a first antenna switch,
    a second antenna for frequencies in a second frequency range, the second frequency range including lower frequencies than the first high-frequency frequency range,
    a second signal path, which connects the second antenna to a second antenna tuner, connects the second antenna tuner to a second detector that is configured to measure reflected power, and connects the second detector to a second antenna switch,
    a controller configured to take signals supplied by the first and second detectors as a basis for producing control signals for controlling the first and second antenna tuners,
    wherein the controller has a comparator configured to compare the signals from the first and second detectors in order to produce a correction value as a measure of a drop below a threshold value for the reciprocal isolation between the first and second signal paths,
    wherein the control signals are formed from a combination of the correction value and the signal from an active detector arranged in an active signal path, wherein the active detector is the first detector when the first signal path is the active signal path and wherein the active detector is the second detector when the second signal path is the active signal path,
    wherein an inactive signal path is isolated from a respective antenna when the reciprocal isolation between the active signal path in transmission mode and the inactive signal path drops below a threshold value.

12. A module for the front end of a wireless transmission/reception device, the module comprising:
    a first signal path configured to be coupled to a first antenna node for frequencies in a first high-frequency frequency range;
    a first antenna tuner coupled to the first antenna node by the first signal path;
    a first detector coupled to the first antenna tuner by the first signal path, the first detector configured to measure reflected power;
    a first antenna switch coupled to the first detector by the first signal path;
    a second signal path configured to be coupled to a second antenna node for frequencies in a second frequency range that contains low frequencies in comparison with the first frequency range;
    a second antenna tuner coupled to the second antenna node by the second signal path;
    a second detector coupled to a second antenna tuner by the second signal path, the second detector configured to measure reflected power;
    a second antenna switch coupled to the second detector by the second signal path; and
    a controller configured to produce control signals for controlling the antenna tuner, the controller having a comparator configured to compare signals from the first and second detectors in order to produce a correction value as a measure of a drop below a threshold value for the reciprocal isolation between the two signal paths, and to generate a correction value therefrom, wherein the control signals are formed from a combination of the correction value and a signal from the first detector when the first signal path is active or a signal from the second detector when the second signal path is active,
    wherein one of the first signal path or second signal path has a selectively connectable supplementary filter,
    wherein the supplementary filter is connected to one of the signal paths only when the reciprocal isolation between this signal path and the active signal path, drops below the threshold value.

13. The module according to claim 12, further comprising:
    a first antenna coupled to the first antenna node; and
    a second antenna coupled to the second antenna node.

14. The module according to claim 12, wherein the first antenna tuner includes a first capacitance coupled in series with the first signal path and a second capacitance coupled in parallel with the first signal path, wherein the first and second capacitances can be altered on the basis of the control signal.

15. The module according to claim 12, wherein the first and second detectors comprise directional couplers.

16. The module according to claim 12,
    wherein the control signal produced by the controller is a DC signal;

wherein the controller produces a normal voltage and the control signal is generated as a deviation from the normal voltage;

wherein the first antenna tuner has a closed-loop control interval; and wherein the first antenna tuner is in the center of its closed-loop control interval when the normal voltage is applied.

17. The module according to claim 12, wherein the first signal path has a selectively connectable supplementary filter that is connected to the first signal path only when the reciprocal isolation between the first signal path and an active signal path used for transmission drops below a threshold value.

18. A module for a front end of a wireless transmission/reception device, the module comprising:
- a first antenna for frequencies in a first high-frequency frequency range;
- a first antenna tuner;
- a first detector that is configured to measure reflected power;
- a first antenna switch;
- a first signal path connecting the first antenna to the first antenna tuner, wherein the first signal path connects the first antenna tuner to the first detector, and connects the first detector to the first antenna switch,
- a second antenna for frequencies in a second frequency range, the second frequency range including lower frequencies than the first high-frequency frequency range;
- a second antenna tuner;
- a second detector that is configured to measure reflected power;
- a second signal path connecting the second antenna to the second antenna tuner, wherein the second signal path connects the second antenna tuner to the second detector, and connects the second detector to the second antenna switch; and
- a controller configured to generate control signals for controlling the first and second antenna tuners, wherein the controller is configured to take signals supplied by the first and second detectors as a basis for producing the control signals, wherein the controller comprises a comparator configured to compare the signals from the first and second detectors in order to produce a correction value as a measure of a drop below a threshold value for the reciprocal isolation between the first signal path and the second signal path, wherein the control signals are generated from a combination of the correction value and the signal from an active detector arranged in an active signal path, wherein the active detector is the first detector when the first signal path is the active signal path and wherein the active detector is the second detector when the second signal path is the active signal path, wherein one of the first signal path or second signal path has a selectively connectable supplementary filter, and wherein the supplementary filter is connected to one of the signal paths only when the reciprocal isolation between this signal path and the active signal path drops below the threshold value, wherein the first antenna tuner has a first capacitance connected in series with the first signal path, and a second capacitance connected in parallel with the first signal path, wherein the first and second capacitances are configured to be altered in response to the control signal, and wherein the first antenna tuner further comprises static inductances.

\* \* \* \* \*